US012682929B1

(12) United States Patent
Von Lerber et al.

(10) Patent No.: US 12,682,929 B1
(45) Date of Patent: Jul. 14, 2026

(54) REDUCTION OF INTERSYMBOL INTERFERENCE BY MATCHING A VOXEL LATTICE CONSTANT AND A POINT SPREAD FUNCTION SHADOW IN OPTICAL SYSTEMS

(71) Applicant: Microsoft Technology Licensing, LLC, Redmond, WA (US)

(72) Inventors: Tuomo Antero Von Lerber, Helsinki (FI); Anton Viljami Autere, Järvenpää (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 19/246,907

(22) Filed: Jun. 24, 2025

(51) Int. Cl.
*G11B 7/00* (2006.01)
*G11B 3/06* (2006.01)
*G11B 7/005* (2006.01)
*G11B 15/68* (2006.01)

(52) U.S. Cl.
CPC ................................... *G11B 7/005* (2013.01)

(58) Field of Classification Search
CPC ................ G11B 5/54; G11B 220/2504; G11B 2007/0065; G11B 7/0065; G11B 15/68; G11B 15/6885; G11B 15/1883; G11B 2007/00653; G06F 3/061; G06F 3/0634; G06F 3/0653
USPC ......................................................... 369/103
See application file for complete search history.

(56) References Cited

U.S. PATENT DOCUMENTS 10,719,239 B2 * 7/2020 Rowstron ............... G06F 3/061

* cited by examiner

*Primary Examiner* — Nabil Z Hindi

(57) ABSTRACT

Technology is disclosed for improving read accuracy and storage capacity in optical data storage systems. The technology includes writing, with an optical write system, voxels into a voxel lattice having a voxel lattice constant (VLC) of an optical storage medium and reading, with an optical read system, the voxels from the optical storage medium. The optical read system includes optical components that have a point spread function (PSF). The VLC matches a shadow of the PSF either by virtue of the write system setting the VLC to match the shadow of the PSF of the read system or the read system adjusting the optical components to match the shadow of the PSF with the VLC. The system may be tuned by selecting which shadow of the PSF is used for matching with the VLC, the shape of the voxel lattice, the number of bits per voxel, or a combination.

20 Claims, 13 Drawing Sheets
(6 of 13 Drawing Sheet(s) Filed in Color)

400

| | Grid Shape | Bits/ Voxel | Shadow | VLC | Density (voxel/μm) | Accuracy | Payload Efficiency | Information Density | Improvement over POR |
|---|---|---|---|---|---|---|---|---|---|
| 1 | Rectangle | 2 | 1st | 0.7 x 0.5 | 2.9 | 88.90% | 55% | 3.2 | POR |
| 2 | Square | 2 | 2nd | 0.98 | 1 | 97.60% | 90% | 1.8 | -44% |
| 3 | Square | 2 | 1st | 0.48 | 4.3 | 83.10% | 33% | 2.8 | -13% |
| 4 | Square | 1 | 1st | 0.48 | 4.3 | 99.90% | 100% | 4.3 | 33% |
| 5 | Hexagonal | 2 | 2nd | 0.98 | 1.2 | 95.30% | 81% | 1.9 | -39% |
| 6 | Hexagonal | 2 | 1st | 0.48 | 5 | 78.00% | 12% | 1.2 | -62% |
| 7 | Hexagonal | 1 | 1st | 0.48 | 5 | 99.50% | 98% | 4.9 | 52% |

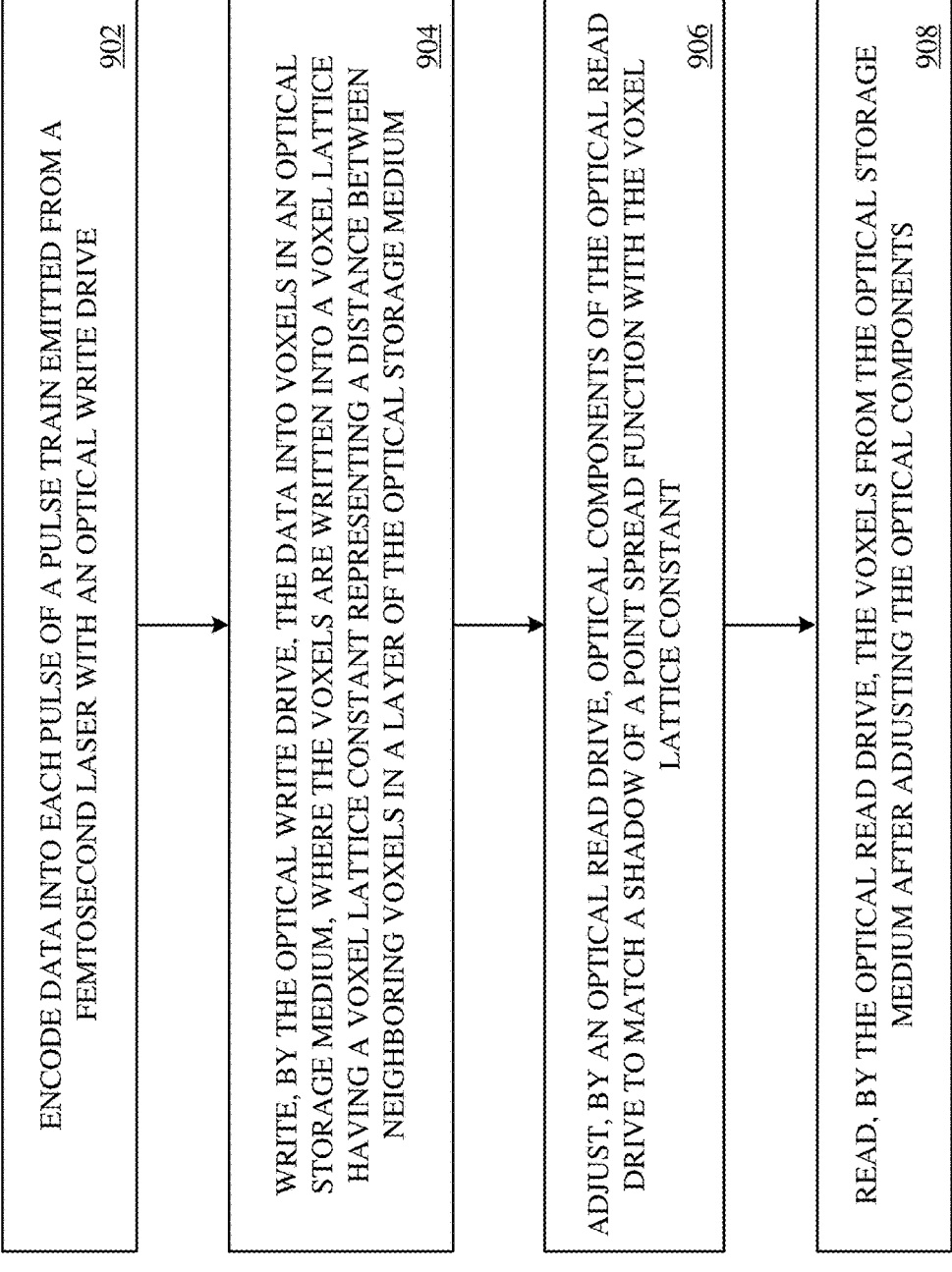

ENCODE DATA INTO EACH PULSE OF A PULSE TRAIN EMITTED FROM A FEMTOSECOND LASER WITH AN OPTICAL WRITE DRIVE

902

WRITE, BY THE OPTICAL WRITE DRIVE, THE DATA INTO VOXELS IN AN OPTICAL STORAGE MEDIUM, WHERE THE VOXELS ARE WRITTEN INTO A VOXEL LATTICE HAVING A VOXEL LATTICE CONSTANT REPRESENTING A DISTANCE BETWEEN NEIGHBORING VOXELS IN A LAYER OF THE OPTICAL STORAGE MEDIUM

904

ADJUST, BY AN OPTICAL READ DRIVE, OPTICAL COMPONENTS OF THE OPTICAL READ DRIVE TO MATCH A SHADOW OF A POINT SPREAD FUNCTION WITH THE VOXEL LATTICE CONSTANT

906

READ, BY THE OPTICAL READ DRIVE, THE VOXELS FROM THE OPTICAL STORAGE MEDIUM AFTER ADJUSTING THE OPTICAL COMPONENTS

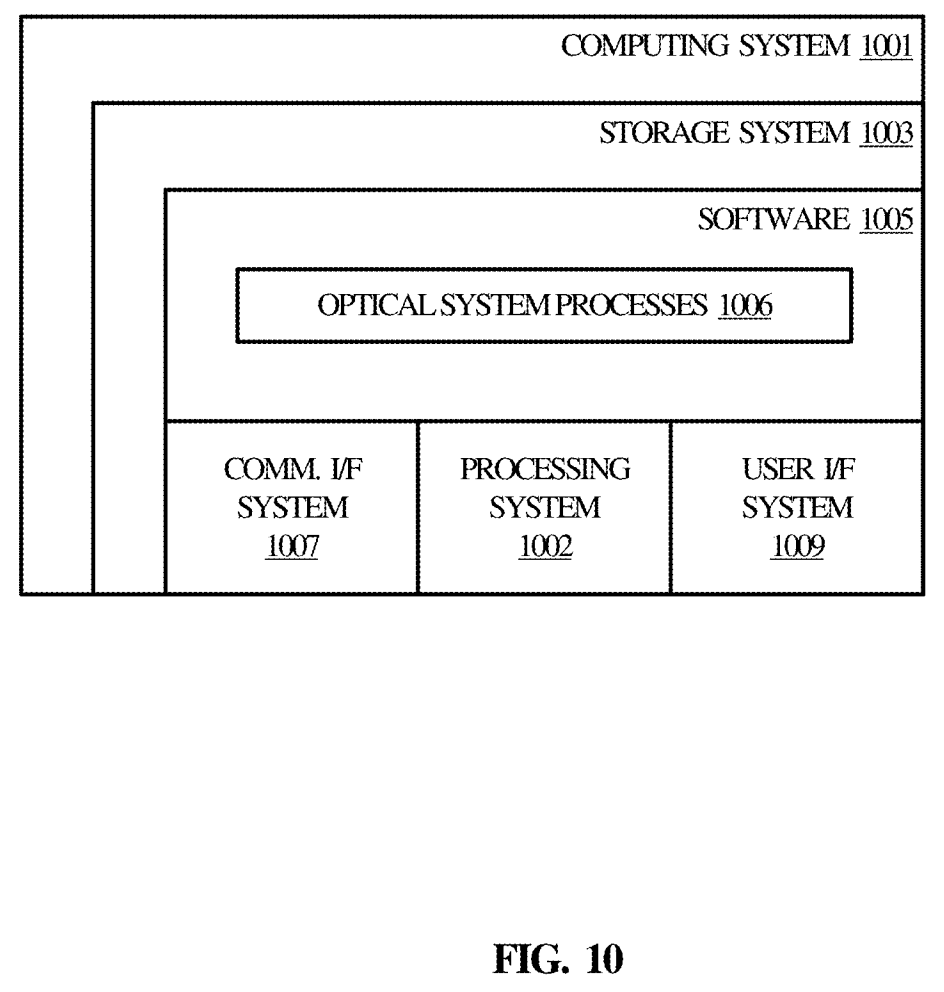

COMPUTING SYSTEM 1001

STORAGE SYSTEM 1003

SOFTWARE 1005

OPTICAL SYSTEM PROCESSES 1006

COMM I/F SYSTEM 1007

PROCESSING SYSTEM 1002

USER I/F SYSTEM 1009

FIG. 10

REDUCTION OF INTERSYMBOL INTERFERENCE BY MATCHING A VOXEL LATTICE CONSTANT AND A POINT SPREAD FUNCTION SHADOW IN OPTICAL SYSTEMS

TECHNICAL FIELD

Aspects of the disclosure are related to the field of laser systems and, in particular, to mitigating intersymbol interference by matching the voxel lattice constant and point spread function shadow.

BACKGROUND

Cold (i.e., long-term) storage of digital data converts data into a persistent, physical state change within a data-storage medium. Methods for storing data include writing voxels into an optical storage medium (e.g., a glass plate). To create the data for each voxel, an ultrafast pulsed laser (e.g., femtosecond laser) provides a pulse train. The pulses in the pulse train are modulated to modify the energy in the pulse to represent the data. A booster amplifier is used to boost the energy of each pulse to have sufficient energy to create the physical state change in the optical storage medium. The pulses are directed to different locations in the optical storage medium to write each voxel into a voxel lattice in three dimensions. To obtain the data from the optical storage medium, a read system illuminates each voxel, and an image containing voxel information enters an optical system that determines the data represented by the voxel based, for example, on the brightness of the voxel. One issue with cold storage is intersymbol interference, in other words, how much neighboring voxels interfere with the accuracy of reading a voxel. To improve reading accuracy, voxel size and location may be considered. However, distancing the voxels too far or increasing their size too much may impact storage capacity (i.e., the amount of data the optical storage medium is capable of storing). The number of voxels that may be written into the optical storage medium is based on the size of the voxel lattice, which impacts storage efficiency and reading accuracy. The result is a constant tension or balance between the read accuracy and the storage capacity of the optical storage medium. While current systems strive for this balance, improvements may be helpful to increase both storage capacity and read accuracy.

Overview

Technology is disclosed herein for improving accuracy during reading of voxels from an optical storage medium as well as improving storage capacity of the optical storage medium. One way to improve the reading accuracy includes mitigating interference from neighboring voxels (i.e., intersymbol interference). As described in detail, optical components of a read system have characteristics including a point spread function (PSF). Point spread functions include shadows, which may be leveraged to reduce intersymbol interference. Voxels are written into a voxel lattice having a voxel lattice constant. The voxel lattice constant is the spacing or periodicity between adjacent voxels. In other words, the voxel lattice constant is the distance between the centers of two adjacent voxels along a given axis. By matching the voxel lattice constant with a shadow of the PSF, the neighboring voxels interfere less with reading a given voxel (i.e., lower intersymbol interference). The system can be tuned by selecting which shadow of the PSF is used for matching with the voxel lattice constant, the shape of the voxel lattice, the number of bits per symbol stored in each voxel, or any combination.

One general aspect includes an optical read system including a read controller. The read controller may include a light source (e.g., laser, light emitting diode (LED), or the like) configured to emit a beam and a sensor system configured to detect voxels written in an optical storage medium, where the voxels are written in the optical storage medium in a voxel lattice having a voxel lattice constant representing a distance between neighboring voxels in a layer of the optical storage medium. The system also includes a decoder configured to decode the voxels to identify data represented by the voxels. The system further includes an optical read head, which includes optical components including one or more lenses and a focusing system. The optical read head is configured to receive and steer the beam toward the voxels. The optical components have a point spread function, and the optical components are configured to match a shadow of the point spread function with the voxel lattice constant.

Implementations of this aspect may include one or more of the following features. Optionally, the focusing system is configured to adjust the point spread function to match the shadow of the point spread function with the voxel lattice constant. In some cases, to adjust the point spread function, the focusing system is configured to modify the numerical aperture of at least one of the lenses. In some cases, to adjust the point spread function, the focusing system is configured to modify the beam using deformable mirrors or spatial light modulators. In some cases, to adjust the point spread function, the focusing system is configured to modify a wavelength of the beam.

The point spread function may include at least two shadows. Optionally, the optical components are configured to match one shadow of the shadows with the voxel lattice constant.

Optionally, the voxel lattice is a rectangular grid or a hexagonal grid. Optionally, each voxel stores a one-bit symbol or a two-bit symbol. Optionally, the voxel lattice constant is between 150 nanometers and 600 nanometers. Implementations of the described techniques may include hardware, a method or process, or computer software on a computer-accessible medium.

Another general aspect includes an optical write system including a write controller. The write controller includes a laser configured to emit a beam having a pulse train, and a modulation system including modulators configured to modulate the pulses of the pulse train to encode data in each pulse of the pulse train. The system also includes an optical write head having optical components including one or more lenses and a scanning system configured to use the optical components to direct the beam, including the modulated pulses in the pulse train, at an optical storage medium to write the data into the optical storage medium. The optical components are configured to write the data into voxels in a voxel lattice having a voxel lattice constant representing a distance between neighboring voxels in a layer of the optical storage medium and match the voxel lattice constant with a shadow of a point spread function of an optical read system.

Implementations of this aspect may include one or more of the following features. Optionally, the scanning system is configured to adjust the voxel lattice constant to match the voxel lattice constant with the shadow of the point spread function. To adjust the voxel lattice constant, the scanning system may be configured to instruct movement of the optical write head to write the voxels into the optical storage medium at precise locations corresponding to the adjusted voxel lattice constant.

The point spread function may include at least two shadows, and the optical components may be configured to match the voxel lattice constant with one shadow of the shadows.

Optionally, the voxel lattice may include a rectangular grid or a hexagonal grid.

Optionally, the modulation system is configured to modulate each pulse of the pulse train to encode a one-bit symbol in each voxel. Optionally, the modulation system is configured to modulate each pulse of the pulse train to encode a two-bit symbol in each voxel. Optionally, the modulation system is configured to amplify each pulse of the pulse train such that each voxel of the voxels fits within a space of the voxel lattice and the voxel lattice constant is between 150 nanometers and 600 nanometers. Implementations of the described techniques may include hardware, a method or process, or computer software on a computer-accessible medium.

Yet another general aspect includes a method for matching a shadow of a point spread function and a voxel lattice constant. The method includes encoding, by an optical write drive, data into each pulse of a pulse train emitted from a femtosecond laser. The method further includes writing, by the optical write drive, the data into voxels in an optical storage medium, where the voxels are written into a voxel lattice having a voxel lattice constant representing a distance between neighboring voxels in a layer of the optical storage medium. The method further includes adjusting, by an optical read drive, optical components of the optical read drive to match a shadow of a point spread function with the voxel lattice constant. The method further includes reading, by the optical read drive, the voxels from the optical storage medium after adjusting the optical components. Other embodiments of this aspect include corresponding computer systems, apparatus, and computer programs recorded on one or more computer storage devices, each configured to perform the actions of the methods.

Implementations of this aspect may include one or more of the following features. The point spread function may include at least two shadows, and the optical read drive adjusts the optical components to match one of the shadows with the voxel lattice constant. Implementations of the described techniques may include hardware or computer software on a computer-accessible medium.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 8 illustrates a table depicting outcome data for a number of example scenarios, according to some embodiments.

FIG. 9 illustrates a method of matching voxel lattice constant and the shadow of a point spread function, according to some embodiments.

FIG. 10 illustrates a computing system suitable for implementing the various operational environments, architectures, processes, scenarios, and sequences discussed below with respect to the other Figures.

DETAILED DESCRIPTION

Figure 1:
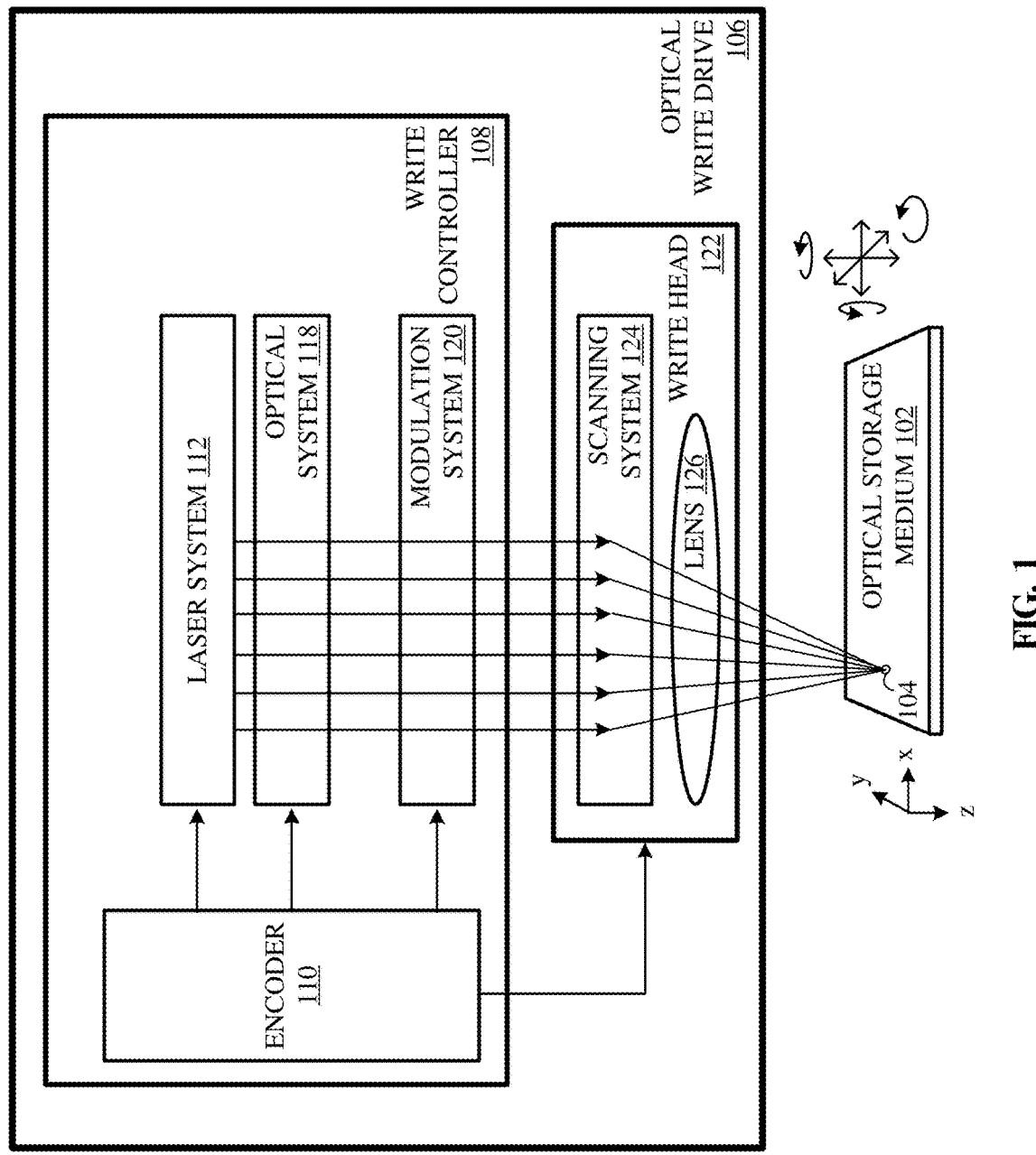
FIG. 1 illustrates an example optical data write system, according to some embodiments.

Technology is disclosed herein for improving storage capacity and reducing intersymbol interference in optical data storage systems. As discussed above, voxels can be written into the optical storage medium packed closely together in an effort to increase the data storage capacity of the optical storage medium, but this is in tension with the read accuracy. Voxels that are close in distance may impact read accuracy due to intersymbol interference. In other words, neighboring voxels may impact the accuracy of the data when read if the voxels are too close together. However, using the techniques discussed herein, optical read and write systems may be tuned to improve both storage capacity and read accuracy.

One technique for improving read accuracy and storage capacity of the optical storage medium includes matching a voxel lattice constant and a shadow of a point spread function. The voxel lattice constant represents the distance between neighboring voxels in a voxel lattice and is measured by the distance between the center of two neighboring cells in a voxel lattice. The point spread function is a function of the optical components of the read system. The point spread function has shadows, which may be leveraged to mitigate intersymbol interference by matching the voxel lattice constant and a shadow of the point spread function. The matching can be performed by the read system or the write system. The write system may be configured to write the voxels with a lattice constant matching the desired shadow of the point spread function of the read system. Alternatively, the read system can adjust the optical system such that the shadow of the point spread function matches the voxel lattice constant. For example, a focusing system in the read system can adjust the numerical aperture of the reading lens to adjust the point spread function to align a shadow of the point spread function with neighboring voxels of the voxel being read (i.e., match the shadow with the voxel lattice constant).

The read and write systems may further be tuned to improve the space capacity of the optical storage medium as well as the read accuracy of the read system. For example, selection of one of the shadows of the point spread function may improve performance due to the intensity of the shadow. Additionally, selection of a voxel lattice may improve performance. For example, a hexagonal grid may return improved results over a rectangular grid. Further, selection of a bit-per-symbol value may impact results. For example, voxels having one-bit values (e.g., the voxel is either present or not present; two possible values) may reduce the storage capacity but improve the read accuracy over voxels having two-bit values (e.g., the voxel is large, mid-sized, small, or absent; four possible values). Tuning one or more of these selections in addition to matching the shadow of the point spread function and the voxel lattice constant provides further improved results.

Advantageously, the techniques described herein increase the read accuracy of data stored on optical storage mediums without decreasing the storage capacity. Depending on the tuning performed, the techniques may also increase the storage capacity of the optical storage medium without increasing the physical size or the material used for the optical storage medium. Since the physical media in the cold storage facilities takes up physical space, increasing storage capacity of each optical storage medium (e.g., glass plate) can have substantial impact on the size of the facility needed to house the stored data.

Turning now to the figures, FIG. 1 illustrates an example block diagram of an optical data write system 100. Optical data write system 100 includes an optical write drive 106 that writes voxels 104 onto optical storage medium 102.

Optical write drive 106 includes write controller 108 and write head 122. In some embodiments, optical write drive 106 may include different or other components or they may be arranged differently. Optical write drive 106 includes the components needed for making permanent modifications to change the physical structure of optical storage medium 102 (i.e., writing voxels 104). Write controller 108 controls encoding the data into the beam used to write the voxels 104, and write head 122 controls transmitting the beam to write the voxels 104 onto the optical storage medium 102.

Write controller 108 includes encoder 110, laser system 112, optical system 118, and modulation system 120. Write controller 108 may include more or fewer components or the components may be grouped or arranged differently in some embodiments.

Encoder 110 provides signals to laser system 112, optical system 118, modulation system 120, and write head 122 to convert the data for writing on optical storage medium 102 into signals used by laser system 112, optical system 118, modulation system 120, and write head 122 to generate the corresponding voxels 104. Encoder may include or be controlled by one or more microprocessors (not shown) that may be generally representative of computing system 1001 described with respect to FIG. 10. While depicted as integrated into write controller 108, in some embodiments encoder 110 may be separate from write controller 108 in optical write drive 106.

Laser system 112 includes at least one laser such as an ultrafast pulse laser. In some embodiments, the ultrafast pulse laser may be a fiber laser or a high-power solid-state laser. Laser system 112 may include additional components not shown here for ease of description. Laser system 112 may include any ultrafast laser such as a femtosecond laser. Laser system 112 emits an optical beam having a pulse train. The pulse train has a pulse duration, which is the duration of each pulse, which is ultrafast. The pulse duration may be in the femtosecond, picosecond, or nanosecond range. For example, the pulse duration may be one hundred and fifty femtoseconds (150 fs), though the pulse duration may be any suitable duration. For example, the pulse duration may be from a few femtoseconds to hundreds of nanoseconds. The pulse train has a spectral bandwidth that includes one or more wavelengths. For example, the wavelength of the pulse train may be centered at any suitable wavelength, such as, for example, between 1020 nanometer and 1060 nm (1020-1060 nm). Based on the pulse duration, the spectral bandwidth may expand a number of nanometers, so for a pulse train having a pulse duration of 150 fs and a central wavelength of 1030 nm, the spectral bandwidth may be approximately 10.3 nm, centered at 1030 nm such that the range is approximately 1025 nm to 1030 nm (1025-1035 nm). The pulse train also has a pulse gap separating the pulses, a peak power, an average power, and a repetition rate. For example, the pulse train may have a repetition rate of twenty MegaHertz (20 MHz), though the repetition rate may be any suitable repetition rate. For example, the repetition rate may be between five and one hundred (5-100 MHz). The repetition rate of the optical beam output from write head 122 dictates the speed at which voxels 104 are written. However, the speed at which write head 122 and/or optical storage medium 102 can move with respect to each other may limit the speed at which the data may be written. Laser system 112 emits the pulse train with a pulse duration and a pulse gap. The pulse gap is the duration between the end of one pulse and the beginning of the next pulse. For example, in a 20 MHz pulse train with a 150 fs pulse duration, the pulse period (i.e., the time from the start of one pulse to the start of the next pulse) is fifty nanoseconds (50 ns), and the pulse duration is 150 fs, so the pulse gap is 50 ns minus 150 fs, which equals 49.99985 ns (50 ns–150 fs=49.99985 ns). The pulse train also has a peak power and an average power. The peak power of the pulse train is the power of each pulse. Accordingly, each pulse in the pulse train has the same power, which is the peak power. The peak power is determined by dividing the energy per pulse by the pulse duration. For a pulse train having an average power of ten milliWatts (10 mW), a repetition rate of 20 MHz, and a pulse duration of 150 fs, the peak power is approximately 3.3 kiloWatts (3.3 kW). In other words, the average power represents the average output power, but the power is delivered in short, high intensity bursts of the pulses.

In some embodiments, laser system 112 may include other lasers, such as a continuous wave laser that emits a constant, uninterrupted beam of coherent light over time (i.e., a continuous wave beam), as opposed to delivering energy in pulses like the ultrafast pulse laser. A continuous wave laser outputs a continuous wave beam with steady optical output power. In other words, the light intensity of the continuous wave beam does not vary significantly. In some embodiments, the continuous wave laser may be combined with the pulse train from the ultrafast pulse laser to, for example, stabilize the power of the combined beam. Encoder 110 may provide signaling to laser system 112 to vary the power, wavelength, or other parameters for the continuous wave laser based on the data being written and corresponding to the signals sent to modulation system 120 to ensure the continuous wave beam adjusts to correspond to the modulation as needed to accomplish the desired result.

Optical system 118 may include beam splitting optics, beam steering optics, or a combination. Laser system 112 may be optically coupled to the modulation system via optical system 118. Encoder 110 may provide signals to optical system 118 to drive components within optical system 118 for beam steering, beam splitting, or the like.

Modulation system 120 includes components for modulating and amplifying the beams from laser system 112 to generate the final beams used to write voxels 104 onto optical storage medium 102. Modulation system 120 may modulate the pulses of the pulse train to embed (i.e., encode) the desired data for writing the voxels 104 into the final beam. For example, one or more beams may be steered by optical system 118 into modulation system 120. Each beam may include a copy of the pulse train. Each beam may travel a channel in modulation system 120 that includes one or more modulators and one or more amplifiers among other possible components. A modulator in each channel receives instructions from encoder 110 to encode the desired data for that pulse of that beam. The modulator modulates the beam to modify, for example, the amplitude or intensity of the pulse to represent the data (e.g., symbol). One or more amplifiers may amplify the pulse to ensure there is sufficient intensity when it reaches optical storage medium 102 to make the physical change representing the data (i.e., to write the voxel). Modulation system 120 modulates the pulses of the pulse train in the beam depending on configuration information such as the number of bits per symbol. For example, one-bit per voxel (i.e., two possible values/symbols) may be represented by either a voxel 104 being present or no voxel 104 being present in the voxel lattice. Since light without sufficient intensity simply passes through optical storage medium 102, modulation system 120 may modulate pulses intended to not write a voxel 104 low so that their final intensity is insufficient to make the physical change for writing the voxel 104 on optical storage medium 102 in that voxel space (i.e., in the space within the voxel lattice). As another example, two-bits per voxel (i.e., four possible values/symbols) may be represented by the size of the voxel 104 such that a large voxel, a mid-size voxel, a small voxel, or no voxel are the four possible symbols. Accordingly, the intensity of the pulse needed for a large voxel is higher than the intensity of the pulse needed to write a mid-size, small, or no voxel.

Write head 122 includes scanning system 124 and lens 126. Write head 122 may include more components not discussed here for brevity. Scanning system 124 and lens 126 may control points of focus for the laser beams within the interior volume of optical storage medium 102 along a write path. Scanning system 124 may be implemented using, for example, a micro electromechanical system (MEMS) scanners with moveable mirrors, polygon scanners with rotating mirrors, galvanometer scanners with rotating mirrors, piezo scanners, resonant optical scanners, and/or any other suitable scanner type or component. Lens 126 may be implemented to have variable depth of focus. In some embodiments, write head 122 may physically move based on instructions from encoder 110 to write voxels 104 in precise locations on optical storage medium 102. The precise locations of voxels 104 may be arranged based on a grid (i.e., voxel lattice) for the given layer (i.e., in the x-y plane) of optical storage medium 102. The grid may be, for example, a hexagonal grid or a rectangular grid. Encoder 110 may be configured to adjust the voxel lattice constant of the voxel lattice for writing voxels 104. For example, encoder 110 may instruct write head 122 to move to particular locations for writing a given voxel 104 in a precise location based on the voxel lattice. The voxel lattice constant represents the distance between the center of two neighboring voxels 104. Accordingly, the larger the voxel lattice constant, the farther apart neighboring voxels 104 are located in optical storage medium 102. Encoder 110 may optionally instruct the stage on which optical storage medium 102 is disposed to move rather than or in addition to write head 122 in some embodiments. Regardless of the moving component, voxels 104 are written in precise locations in a voxel lattice.

Optical storage medium 102 may be generally representative of any optical storage medium that may be used for long-term data storage such as, for example, glass. The data may be written by modifying the physical structure of the optical storage medium to create voxels 104. Optical write drive 106 creates the beams representing the data and directs the beams onto optical storage medium 102 to form voxels 104. To create voxels 104, pulses are focused at varying depths into the glass of optical storage medium 102. Voxels 104 may encode one or more bits of data based on size, polarization, existence or absence, or the like. The size, existence, or polarization may be created by modulation system 120. Voxels 104 may be written in a manner that extends in three dimensions within the interior volume of optical storage medium 102. For example, voxels 104 may be located side-by-side in a two-dimensional array across the x-y plane (i.e., in layers) and may be written many layers deep along the z dimension.

In some embodiments, optical storage medium 102 and write head 122 may be configured such that relative motion between them with multiple degrees of freedom of motion may be used. For example, optical storage medium 102 may be on a rotating stage (not shown) that may translate in the x-y plane, move up and down along the z axis, provide rotation about one or more axes, or any combination of such. In other examples, write head 122 may be moveable with suitable degrees of freedom of motion with respect to optical storage medium 102, which may rotate or be completely fixed. Scanning system 124 and lens 126 may be configured and operated differently depending, at least in part, on which relative motion is used between write head 122 and optical storage medium 102. In embodiments in which the stage supporting optical storage medium 102 moves, encoder 110 may provide the instructions to the stage for moving optical storage medium 102 to the precise location to ensure voxels 104 are written to the correct space in the voxel lattice and based on the size and shape of the voxel lattice.

Figure 2:
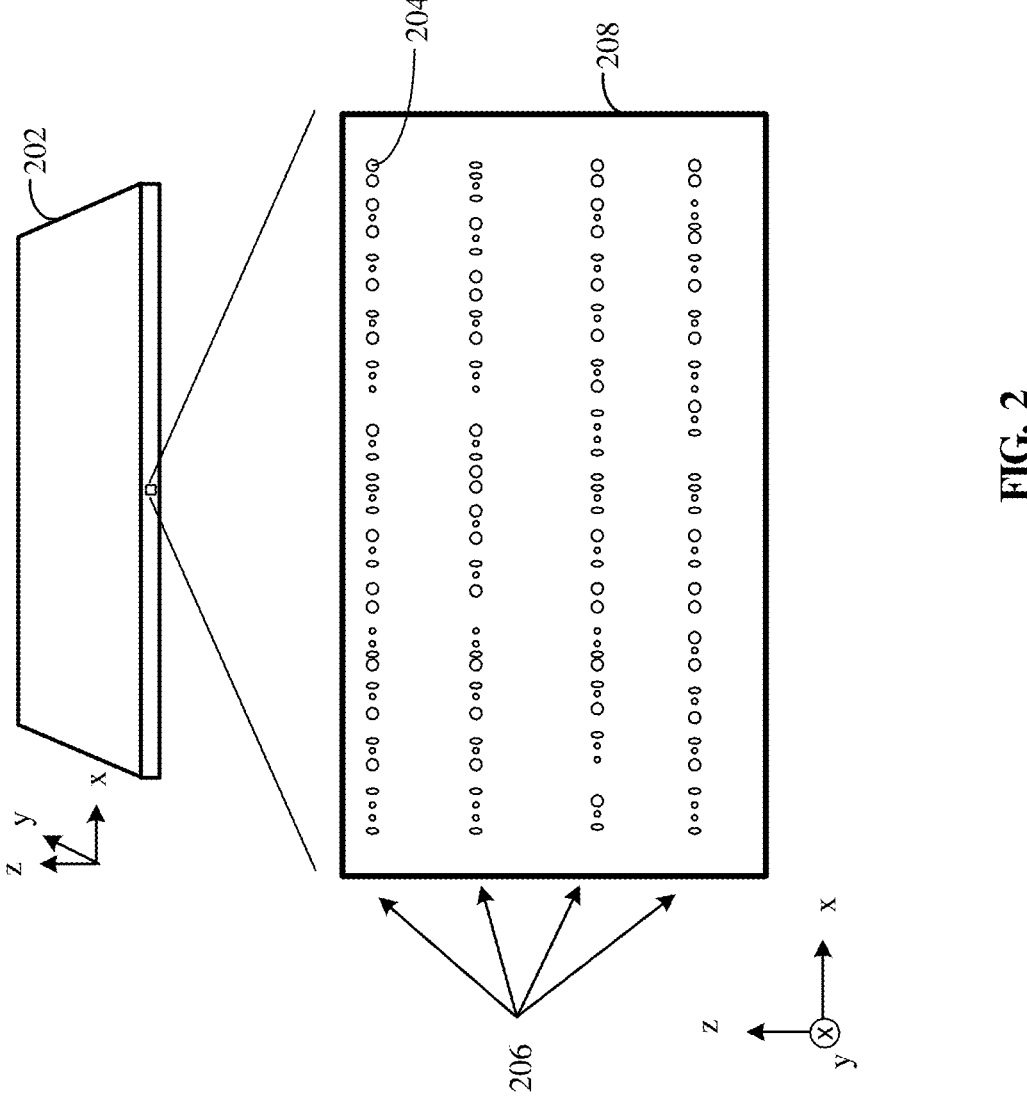
FIG. 2 illustrates an example optical storage medium having voxels arranged in a three-dimensional array, according to some embodiments.

FIG. 2 illustrates an example optical storage medium 202. Optical storage medium 202 may be generally representative of any optical storage medium that may be used for long-term data storage such as, for example, a glass plate including optical storage medium 102 described with respect to FIG. 1. Voxels, representatively indicated by reference numeral 204, are arranged in a three-dimensional array within optical storage medium 202, as depicted in cross-sectional view 208 of a portion of optical storage medium 202. Optical storage medium 202 may be thought of as a three-dimensional array of spaces (i.e., a voxel lattice), and voxels 204 may be written into any of the spaces. Voxels 204 may be used to represent data. For example, the presence or absence of a voxel 204 within a given space may be used such that each space within the array is one bit (i.e., voxel absent equals zero and voxel present equals one). As another example, a size of the voxel 204 may indicate a value. For example, the values may include no voxel, small voxel, medium voxel, or large voxel, such that each space represents two bits (i.e., four possible values). However, any other suitable techniques may be used to represent data using voxels 204 in the optical storage medium 202. Voxels 204 may be sized between, for example, 150 nanometers and 600 nanometers, in various embodiments.

Optical storage medium 202 (e.g., a platter) is a substantially transparent substrate and may be, for example, bulk glass including borosilicate or fused silica (i.e., quartz) glasses. In some embodiments, the substrate may include polymers. The substrate may be formed using a relatively thin optical layer that is coupled to a mechanically stable supporting layer in some applications. Glass is one suitable medium for archival storage because it is low-cost, it is chemically inert and therefore durable and resilient to the environment (e.g., temperature, moisture, electromagnetic interference, and the like), and the structures used to store data have lifetimes of over a thousand years.

Voxels 204 may be light-scattering nanostructures that are embedded in optical storage medium 202. Voxels 204 may be written in layers 206 to encode digital data that is read optically, as described in more detail herein. Within each layer 206, voxels 204 are grouped into planar arrays, typically as two-dimensional (2D) arrays or groups of one-dimensional (1D) arrays. Data is stored in optical storage medium 202 by making permanent physical modifications within the volume of optical storage medium 202. The permanent physical modifications (i.e., voxels 204) are not susceptible to bit rot or corruption. Accordingly, optical storage medium 202 (e.g., glass, glass plate, glass platter, or the like) is sustainable and provides a cost-effective Write-Once-Read-Many (WORM) medium.

The permanent physical modifications change the physical structure of optical storage medium 202 to form voxels 204. Voxels 204 may be created using pulses from a pulsed laser (e.g., ultrafast pulse laser 114). For example, the pulsed laser may be an ultrashort pulse laser that creates high-power pulses on the femtosecond-scale ($\sim 10^{-15}$ seconds) in an optical write drive (e.g., optical write drive 106). To create a voxel 204, pulses are focused at varying depths into optical storage medium 202. A single voxel 204 can encode one or more bits, for example, by modulating the polarization of the laser beam and/or the pulse energy during voxel creation using a modulation system (e.g., modulation system 120) based on instructions from an encoder (e.g., encoder 110). Voxels 204 extend in three dimensions within the volume provided by optical storage medium 202. Voxels 204 may be written side-by-side by the write system (e.g., write system 100) in two-dimensional layered arrays across the xy plane and may be written many hundreds of layers along the z dimension of optical storage medium 202.

Figure 3:
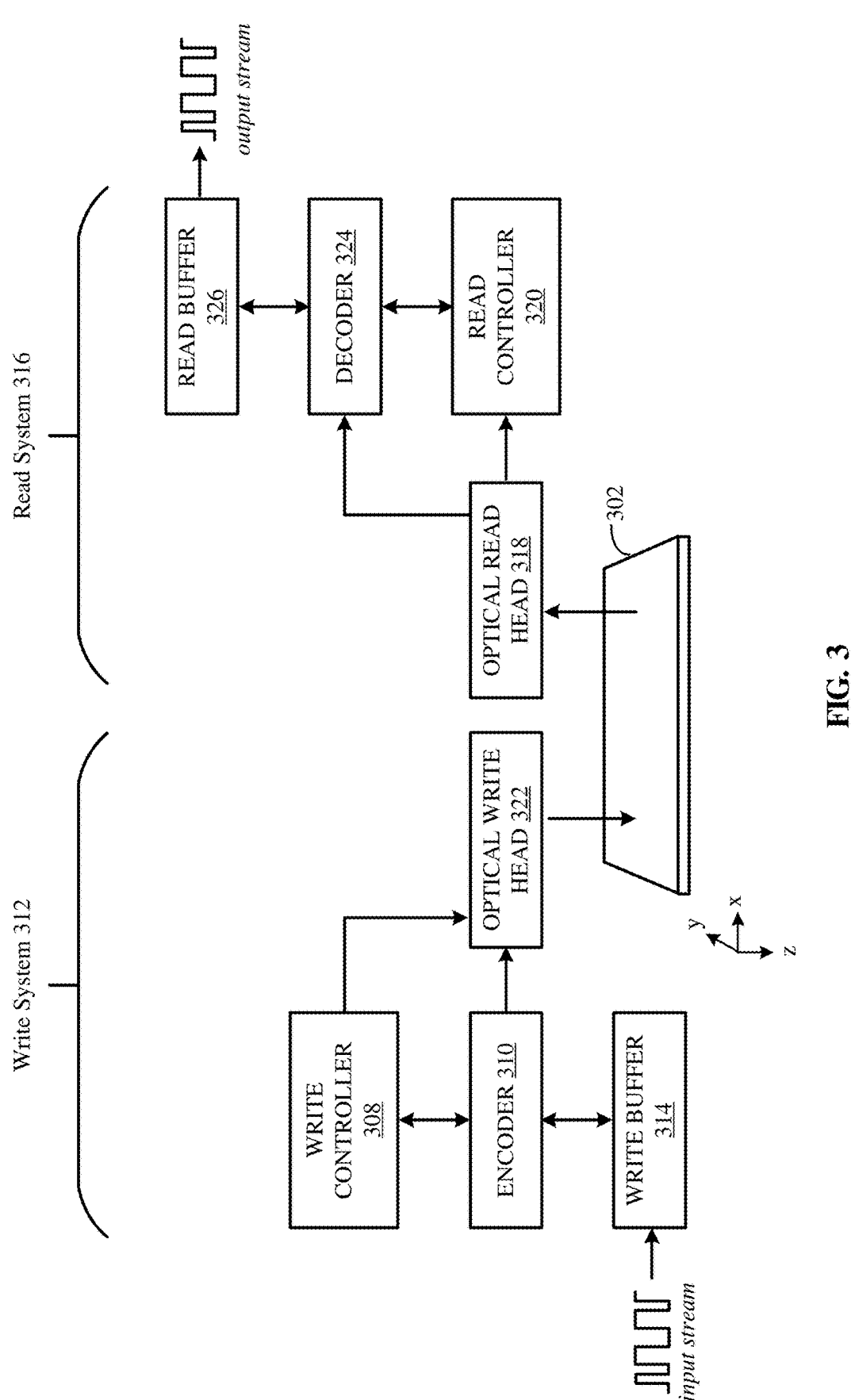
FIG. 3 illustrates an example optical system including a data write and a data read system, according to some embodiments.

FIG. 3 illustrates an example block diagram of an optical data write and read architecture 300. Architecture 300 includes write system 312, optical storage medium 302, and read system 316. While the constituent write system 312 and read system 316 are shown together in architecture 300, they may be operated independently and non-simultaneously. For example, in mass storage scenarios, data is written to optical storage mediums 302 for archiving in a storage library. At some later time, one or more optical storage mediums 302 are retrieved from storage and read using read system 316 to access the stored data. Mass storage providers have the flexibility to separately support and provision the write, storage, and read processes. Providers can apply and scale resources as needed to meet variability of workloads across datacenters so that write, storage, and read capacities are efficiently utilized without excess capacity being stranded and/or insufficient capacity causing bottlenecks and delays.

Optical storage medium 302 may be generally representative of any optical storage medium such as optical storage medium 102 or 202. Write system 312 writes voxels (e.g., voxels 104, 204) onto optical storage medium 302, and read system 316 reads the voxels from optical storage medium 302.

Write system 312 includes write buffer 314, encoder 310, write controller 308, and optical write head 322. Encoder 310 may be generally representative of encoder 110, write controller 308 may be generally representative of write controller 108, and optical write head 322 may be generally representative of write head 122. Write buffer 314 may be any buffer (e.g., memory) for holding the input stream of data for processing by encoder 310.

The input stream of data to be written to optical storage medium 302 is buffered in write buffer 314. Encoder 310 parses the data in write buffer 314 to provide suitable signals to write controller 308. Write controller 308 includes laser system 112, including continuous wave laser 116, to ensure that the pulse train from ultrafast pulse laser 114 is modulated by modulation system 120 prior to amplification without gain variation causing data distortion as described in more detail in the following FIGS. Optical storage medium 302 may be disposed on a movable stage (not shown) on the xy plane that facilitates movement in the relative positioning between optical storage medium 302 and optical write head 322. Voxels (e.g., voxels 104, 204) are written at different locations in the xy plane of the volume while the output laser beam is focused at varying depths to produce layers of voxels along the z axis.

Read system 316 includes optical read head 318, read controller 320, decoder 324, and read buffer 326. Optical read head 318 focuses an illumination beam on a layer of voxels of interest in optical storage medium 302. Advantageously, the power of the illumination light used during reading cannot affect the physical structure of written voxels so the illumination cannot corrupt, overwrite, or erase any data stored, even if buggy, faulty, or under malicious control.

The resultant interactions between the illumination beam and voxels may be collected at optical read head 318 as a sequence of images of the voxels. While optical read head 318 and read controller 320 are depicted on a single side of optical storage medium 302 in FIG. 3, some components, including imaging components, of optical read head 318 or read controller 320 may be on the other side of optical storage medium 302 to capture images of voxels based on light travelling through optical storage medium 302. The images are output from optical read head 318 to decoder 324 that writes a decoded output data stream into read buffer 326. Read controller 320 may also be coupled to decoder 324. Read controller 320 may be responsible for synchronizing the operations of the components under its control to ensure that voxels are appropriately illuminated and imaged during operations of read system 316 to read voxels in optical storage medium 302.

A post-processor is optionally utilized to assist in determination of symbol values. The post-processor can implement a variety of different techniques, as appropriate, such as noise suppression using analog and/or digital circuits. The post-processor can also utilize software-based processing for post voxel detection decision making such as machine learning and artificial intelligence. The functions of decoder 324 and the post-processor can be combined and implemented in a single device, processor, chip, or the like.

Machine learning models can learn and account for any noise properties inherent in the end-to-end write and read processes, including inter-symbol interference between adjacent voxels in the glass, scattered light from neighboring layers during readout, variability between optical components, and other impairments. Machine learning can consider voxel decoding as a classification task such that the post-processor classifies every voxel into its most likely symbol value. For each set of voxels imaged, the post-processor takes the set of images as an input, and outputs a 2D array of probability distributions over the encoded symbols for all voxels in the area, one distribution for each voxel. These distributions may be subsequently used as inputs into error-correction processes to achieve a persistent and reliable optical storage medium 302.

Figure 4:
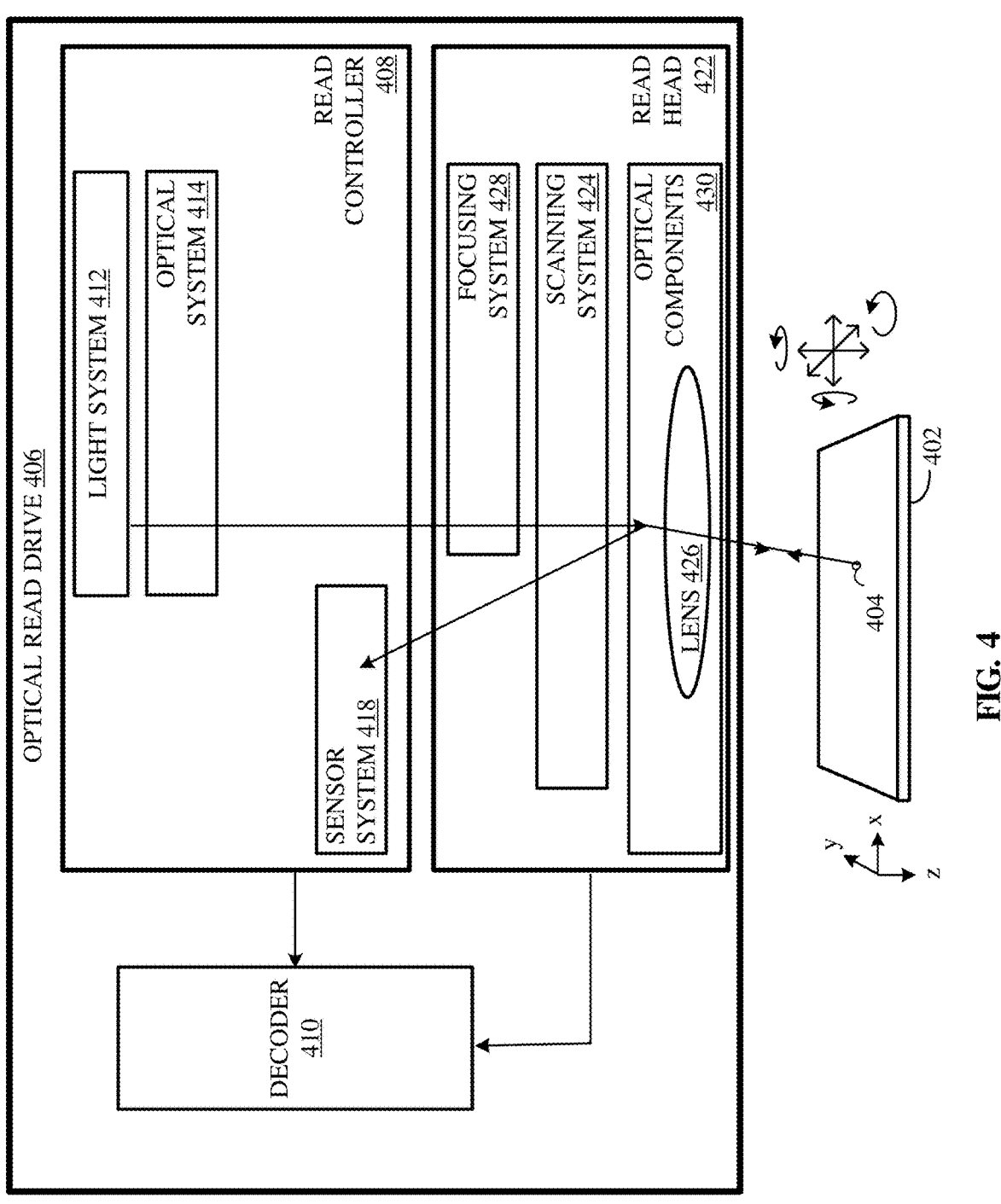
FIG. 4 illustrates an example optical data read system, according to some embodiments.

FIG. 4 illustrates an example block diagram of an optical data read system 400. Optical data read system 400 includes optical read drive 406 that reads voxels 404 from optical storage medium 402.

Optical read drive 406 includes decoder 410, read controller 408, and read head 422. In some embodiments, optical read drive 406 may include different or other components or they may be arranged differently. Optical read drive 406 includes the components needed for illuminating, imaging, and decoding voxels 404 from optical storage medium 402 (i.e., reading voxels 404). Read controller 408 controls illuminating voxels 404 and sensing symbols represented by the voxels 404 using, for example, images of the voxels 404 to sense the intensity of the voxels. Decoder 410 controls decoding the intensity to determine the symbol represented and use the symbols to generate the data stream, and read head 422 controls transmitting, focusing, and steering the illumination beam to read voxels 404 from optical storage medium 402.

Read controller 408 includes light system 412, optical system 414, and sensor system 418. Read controller 408 may include more or fewer components or the components may be grouped or arranged differently in some embodiments.

Light system 412 includes at least one light source such as a laser, a light emitting diode (LED), or the like. The light source may be a continuous beam light source. The light source may be a fiber laser, a high-power solid-state laser, a visible LED, or any other suitable light source. Light system 412 may include additional components not shown here for case of description. Light system 412 emits an optical beam used to illuminate a voxel 404, which allows optical read drive 406 to read the data encoded into voxel 404.

Optical system 414 may include beam splitting optics, beam steering optics, or a combination. Light system 412 may be optically coupled to focusing system 428 in read head 422 via optical system 414. A controller (not shown), such as a microcontroller, may provide signals to optical system 414 to drive components within optical system 414 for beam steering, beam splitting, or the like.

Sensor system 418 may include one or more sensors for detecting the illumination of voxel 404 based on the beam from light system 412. For example, the sensors may detect an intensity or brightness of the voxels 404, and the intensity or brightness may be transmitted to decoder 410 that decodes the intensity into a symbol represented by the voxel 404. Sensor system 418 may include imaging components for collecting images of voxels 404 from which the brightness or intensity may be detected, which may be used by decoder 410 to decode the data stored in the given voxel 404. Additionally, the imaging components may be used to obtain an image of a section of optical storage medium 402, which may be used for analyzing two or more neighboring voxels 404 to calculate the voxel lattice constant (i.e., distance between the center of two neighboring voxels). FIG. 4 illustrates the beam reflecting from voxel 404, which is steered to sensor system 418 and with which an image may be captured by sensor system 418. However, in some embodiments, a portion of sensor system 418 including imaging components may be on the opposite side of optical storage medium 402 from light system 412. In such embodiments, sensor system 418 may capture an image containing voxels 404 based on light transmitted through optical storage medium 402. Sensor system 418 may sense, from the image, brightness or intensity of voxels 404, and decoder 410 can decode the data based on the data from sensor system 418.

Read head 422 includes focusing system 428, scanning system 424, and optical components 430 which includes lens 426. Read head 422 may include more components not discussed here for brevity. Scanning system 424 and lens 426 may control points of focus for the beam within the interior volume of optical storage medium 402 along a read path based at least in part on instructions from focusing system 428. Scanning system 424 may be implemented using, for example, a micro electromechanical system (MEMS) scanners with moveable mirrors, polygon scanners with rotating mirrors, galvanometer scanners with rotating mirrors, piezo scanners, resonant optical scanners, and/or any other suitable scanner type or component. Lens 426 may be implemented to have variable depth of focus. In some embodiments, read head 422 may physically move based on instructions from a controller (e.g., decoder 410) to read voxels 404 from precise locations on optical storage medium 402. The precise locations of voxels 404 may be arranged based on a grid for the given layer (i.e., in the x-y plane) of optical storage medium 402. The grid may be, for example, a hexagonal grid or a rectangular grid as written by optical write drive 106.

Focusing system 428 may adjust the focus of lens 426 as well as the beam used to illuminate voxel 404 using components in optical components 430. Focusing system 428 may be configured to match the shadow of the point spread function of lens 426 with the voxel lattice constant used for writing voxels 404 on optical storage medium 402. In some embodiments, initial readings may be obtained for two or more neighboring voxels 404 to calculate a distance between them (i.e., the voxel lattice constant). Decoder 410 or another controller (not shown) may execute instructions that sends signals to read controller 408 and read head 422 to obtain the readings, and the controller may use the readings to calculate the distance. Once the distance is calculated, focusing system 428 may adjust the point spread function by instructing one or more optical components 430. For example, focusing system 428 may adjust the numerical aperture of lens 426 to adjust the point spread function and the corresponding shadow to match the voxel lattice constant. As another example, focusing system 428 may adjust deformable mirrors or spatial light modulators to modify the beam from light system 412 to adjust the point spread function and the corresponding shadow to match the voxel lattice constant. In some embodiments, focusing system 412 may instruct light system 412 to modify a characteristic of the emitted beam such as the wavelength, the polarization, the coherence, or the like, which may modify the point spread function. Focusing system 428 may include hardware, firmware, and software including instructions executed by a processor (e.g., a microcontroller) that causes signals to be sent to optical components 430 or light system 412 to focus the beam, adjust the point spread function, or both.

Optical storage medium 402 may be generally representative of any optical storage medium that may be used for long-term data storage such as, for example, glass as well as optical storage medium 102, 202, 302. The data is written by a write system that modifies the physical structure of optical storage medium 402 to create voxels 404.

In some embodiments, optical storage medium 402 and read head 422 may be configured such that relative motion between them with multiple degrees of freedom of motion may be used. For example, optical storage medium 402 may be on a rotating stage (not shown) that may translate in the x-y plane, move up and down along the z axis, provide rotation about one or more axes, or any combination of such. In other examples, read head 422 may be moveable with suitable degrees of freedom of motion with respect to optical storage medium 402, which may rotate or be completely fixed. Focusing system 428, scanning system 424, and optical components 430 may be configured and operated differently depending, at least in part, on which relative motion is used between read head 422 and optical storage medium 402. In embodiments in which the stage supporting optical storage medium 402 moves, focusing system 428, decoder 410, or any other controller (not shown) may provide the instructions to the stage for moving optical storage medium 402 to the precise location to ensure voxels 404 are read from the correct space in the voxel lattice and based on the size and shape of the voxel lattice.

Figure 5:
FIG. 5 illustrates an example point spread function heat map overlaid with voxel locations, according to some embodiments.

FIG. 5 illustrates operational scenario 500 depicting point spread function (PSF) heat map 502 and PSF cross section 520. PSF heat map 502 illustrates a point spread function overlaid with a voxel lattice having a hexagonal grid and a voxel lattice constant that matches the second order point spread function minimum (i.e., second shadow of the point spread function). PSF heat map 502 has x-axis and y-axis depicting distance in micrometers. The heat map illustrates the intensity of the point spread function at each distance from the center using intensity legend 514. Red colors indicate higher intensity and blue colors indicate lower intensity. Accordingly, the center of PSF heat map 502 is red, and the focus of the read system (e.g., optical data read system 400) is on focus voxel 510, which is illustrated with a red dot at the center of the voxel space within the voxel lattice (see depiction in FIGS. 6A and 6B for voxel lattice overlay). Concentric blue rings illustrating PSF shadows 508a, 508b, 508c (collectively PSF shadows 508) are blue because the PSF shadows 508 have low intensity. Accordingly, leveraging these low intensity areas to "hide" neighboring voxels 512a, 512b, 512c helps improve read accuracy of focus voxel 510 on which the read system is focused. Due to the hexagonal grid, neighboring voxels 512a, 512b, 512c (collectively neighboring voxels 512) surround focus voxel 510 (note that not all neighboring voxels 512 are labeled in FIG. 5 to avoid visual crowding). All voxels and their neighbors are voxel lattice constant 506 (i.e., a set distance) apart from each other, which is illustrated between voxels 504a and 504b as well as between focus voxel 510 and neighboring voxel 512c. Complete voxels are not depicted and rather are represented by the red dots that show the center of the voxel space in the voxel lattice. Accordingly, voxel lattice constant 506 is the distance between the center of a voxel and the center of its neighbor. In FIG. 5, voxel lattice constant 506 for this particular voxel lattice is approximately 1.0 micrometer. While any of the PSF shadows 508 can be used to "hide" neighboring voxels, PSF heat map 502 illustrates using second PSF shadow 508b. As shown by the coloring in PSF heat map 502, second PSF shadow 508b has the lowest intensity (i.e., dark blue) at the center of the shadow. Accordingly, tuning may indicate that matching second PSF shadow 508b with voxel lattice constant 506 may provide the best read accuracy.

PSF cross section 520 has y axis indicating intensity and x axis indicating distance in micrometers. At the focal point illustrated in PSF heat map 502 as focus voxel 510, distance is 0.0 micrometers, and the intensity of the point spread function is almost 1.0. However, in PSF shadows 508, the intensity of the point spread function is near zero. The distances between the peak intensity of the point spread function and each shadow are illustrated by the dotted lines representing PSF shadows 508.

Figure 6A:
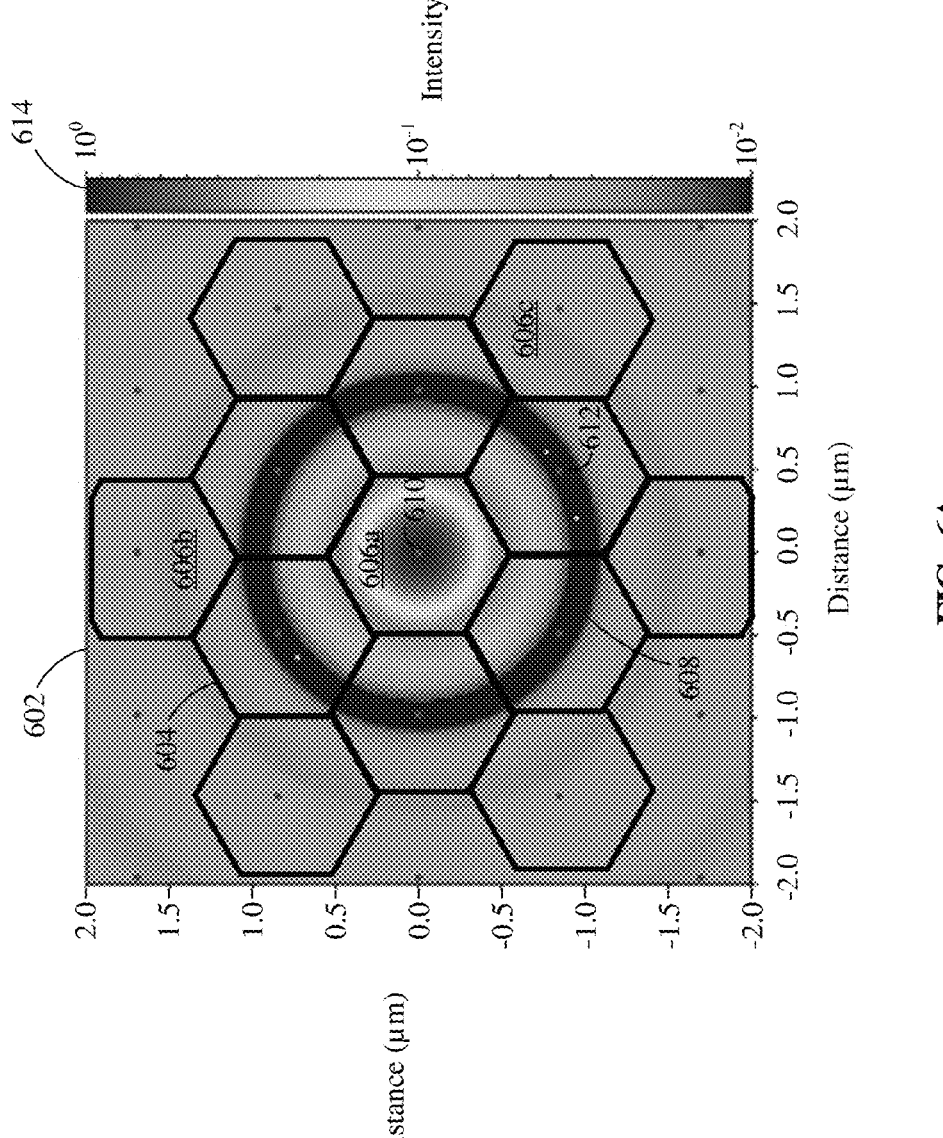
FIG. 6A illustrates an example point spread function heat map overlaid with a hexagonal voxel lattice, according to some embodiments.

FIG. 6A illustrates another operational scenario 600 including PSF heat map 602 overlaid with hexagonal grid voxel lattice 604. PSF heat map 602 is generally representative of a PSF heat map such as PSF heat map 502 described with respect to FIG. 5. Intensity of the point spread function is indicated with color based on intensity legend 614. Hexagonal grid voxel lattice 604 has hexagonal shaped voxel spaces 606, which are represented with reference numerals 606a, 606b, 606c. Not all voxel spaces 606 are numbered to avoid visual clutter. At the center of each voxel space 606 is a red dot representing the voxel that will go in the voxel space 606 as shown by focus voxel 610 at the center of voxel space 606a. PSF heat map 602 illustrates that second shadow 608 is matched to the voxel lattice constant such that neighboring voxels 612 to focus voxel 610 are within second shadow 608.

Figure 6B:
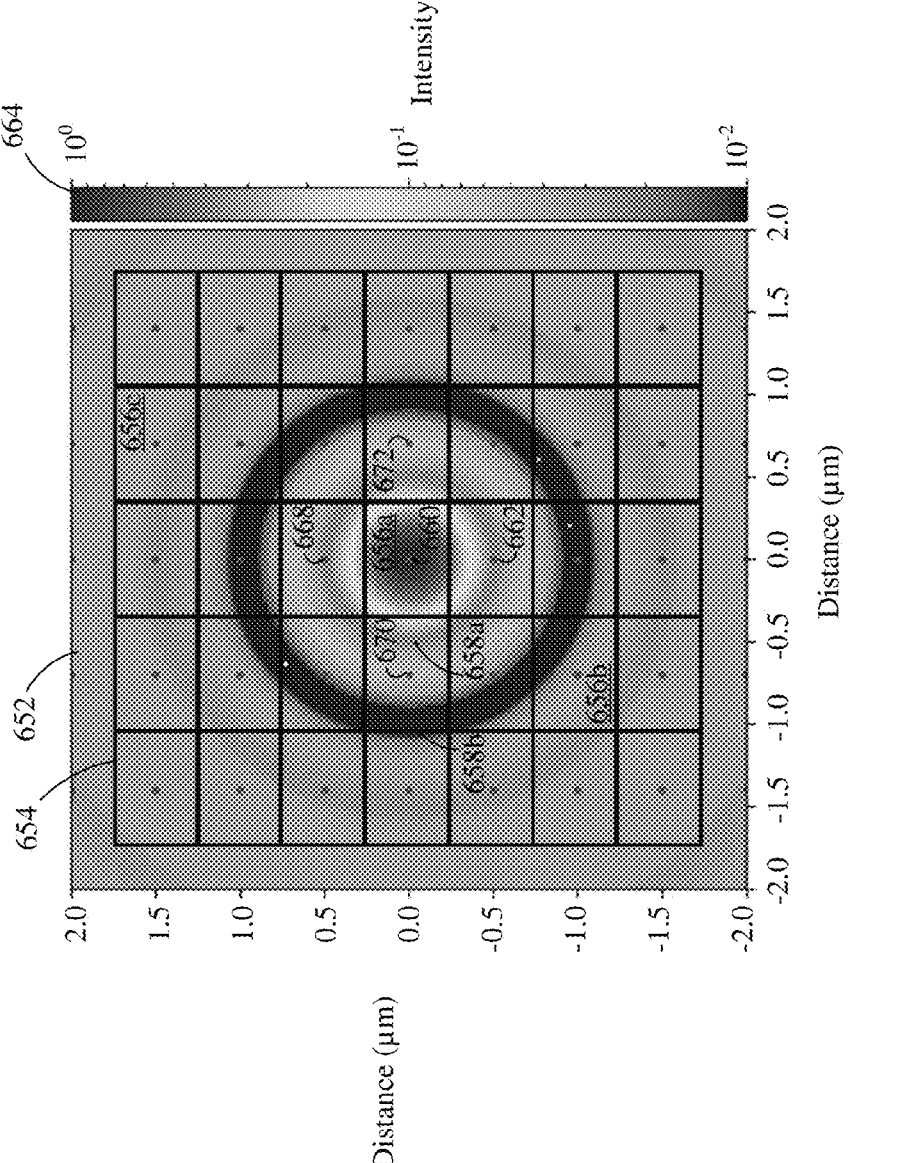
FIG. 6B illustrates an example point spread function heat map overlaid with a grid voxel lattice, according to some embodiments.

FIG. 6B illustrates yet another operational scenario 650 including PSF heat map 652 overlaid with rectangular grid voxel lattice 654. PSF heat map 652 is generally representative of a PSF heat map such as PSF heat map 502 and 602 described with respect to FIGS. 5 and 6A. Intensity of the point spread function is indicated with color based on intensity legend 664. Rectangular grid voxel lattice 654 has rectangular shaped voxel spaces 656, which are represented with reference numerals 656a, 656b, 656c. Not all voxel spaces 656 are numbered to avoid visual clutter. At the center of each voxel space 656 is a red dot representing the voxel that will go in the voxel space 656 as shown by focus voxel 660 at the center of voxel space 656a. Rectangular grid voxel lattice 654 may use any size rectangles including squares. PSF heat map 652 illustrates that no shadows 658 of the PSF are well matched to the voxel lattice constant along any axis. The voxel lattice constant is the spacing or periodicity between adjacent voxels (i.e., the distance between the centers of two adjacent voxels along a given axis). While for square and hexagonal grid voxel lattices the voxel lattice constant is the same along the x and y axes, for rectangles this is not the case. The size of each voxel space 656 is 0.5 micrometers×0.7 micrometers, making the voxel lattice constant along the x-axis 0.7 and along the y-axis 0.5. Accordingly, getting all voxels to fall within a shadow is difficult or may be impossible. Nonetheless, improvements may be realized by matching the voxel lattice constant of one axis to a shadow of the point spread function. As shown in FIG. 6B, the y-axis voxel lattice constant of 0.5 is matched to the first shadow 658a of the point spread function such that neighboring voxels 668, 662 are in the first shadow 658a, however neighboring voxels 670, 672 are not in a shadow.

Figure 7A:
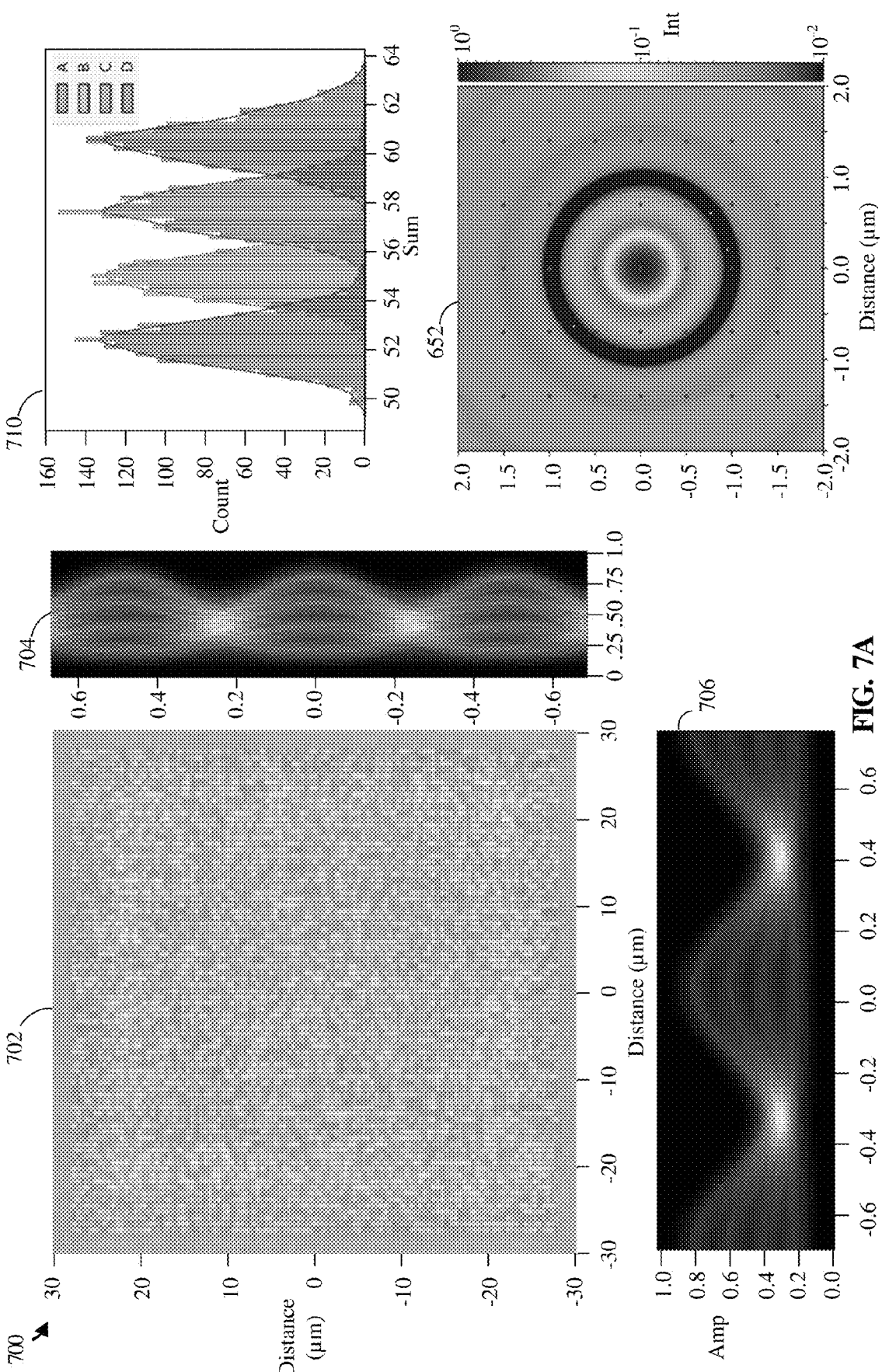
FIG. 7A illustrates an example scenario depicting sample voxel readings including a corresponding eye diagram, truth data, and point spread function heat map, according to some embodiments.
Figure 7B:
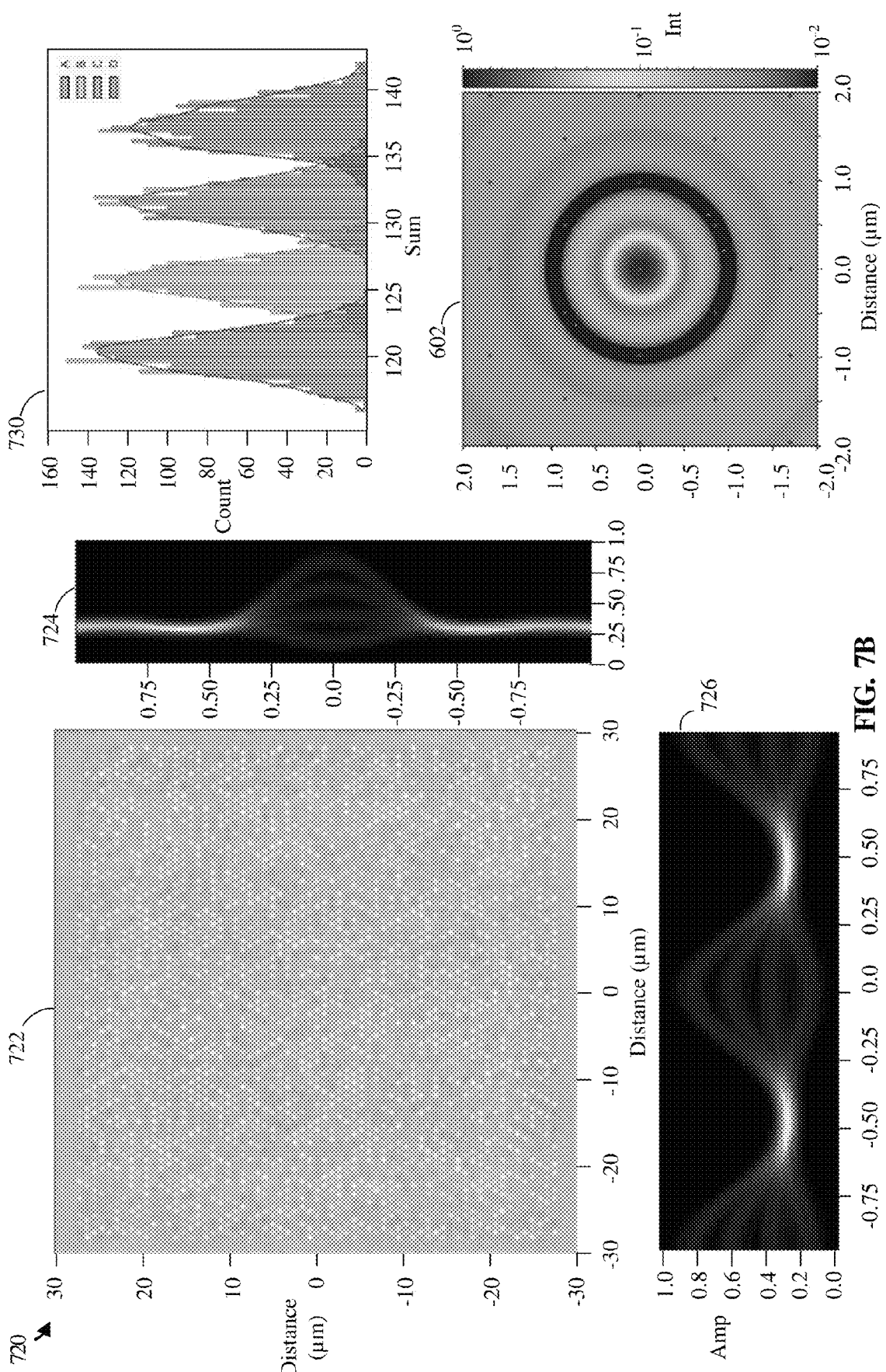
FIG. 7B illustrates another example scenario depicting sample voxel readings including a corresponding eye diagram, truth data, and point spread function heat map, according to some embodiments.
Figure 7C:
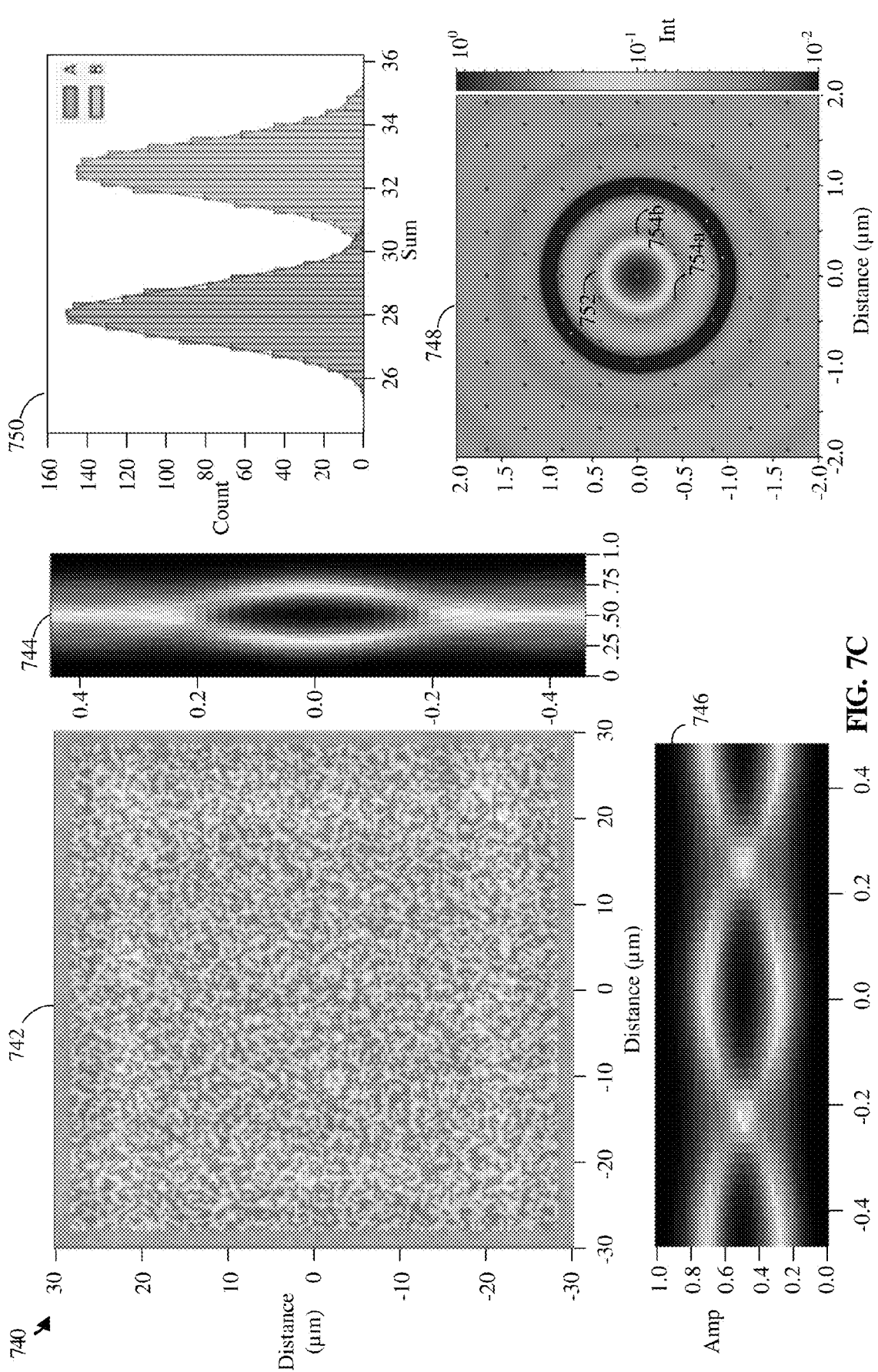
FIG. 7C illustrates yet another example scenario depicting sample voxel readings including a corresponding eye diagram, truth data, and point spread function heat map, according to some embodiments.

FIGS. 7A-7C illustrate operational scenarios depicting results of tuning with various selections for grid shape, number of bits per voxel, shadow selection, and voxel lattice constant. While in each scenario a given layer is depicted and discussed, several layers (i.e., in the z direction) below and above may impact the clarity of the data reads. However, for the purposes of this description, a single layer grid in the x-y plane is viewed and described. FIG. 7A illustrates operational scenario 700. Operational scenario 700 illustrates a scenario in which the voxel lattice is rectangular and the voxel lattice constant is along the x-axis 0.7 and along the y-axis 0.5. Accordingly, PSF heat map 652 is the same in FIGS. 6B and 7A. Using this PSF and voxel lattice constant, image section 702 shows the illumination of each voxel in the lattice. Image section 702 illustrates a 60 micrometer×60 micrometer section of the imaged optical storage medium, and as illustrated in PSF heat map 652, each voxel is written within a 0.5×0.7 micrometer voxel space. Accordingly, there are approximately 120 voxel rows illustrated in image section 702 along the y-axis and approximately 85 voxel columns illustrated along the x-axis. The voxels may be seen in image section 702 as lighter and darker points. Histogram 710 indicates that the voxels are two-bits, meaning one of four symbols, illustrated in histogram 710 as A, B, C, and D by color. The voxels may be detected based on a level of illumination. Symbol A may be the absence of a voxel, which is seen by the darkest voxel spaces in image section 702. Symbol B may be a small voxel, symbol C may be a medium sized voxel, and symbol D may be a large voxel. Accordingly, brighter voxels indicate symbol D, and the less illuminated (i.e., dimmer) voxels may indicate symbol B or C. Decoder 410 may determine, based on the intensity of each voxel, which symbol is represented by the voxel. However, as shown in histogram 710, there is some overlap of symbols A and B between approximately values 52 and 56. Symbols B and C have some overlap between approximately values 55 and 55, symbols C and D have some overlap between approximately values 58 and 61. Where there is overlap, the accuracy of the read data may be inaccurate. For example, a voxel storing symbol A may be decoded by decoder 410 as symbol B. Eye diagrams 704 and 706 illustrate that while there is some eye opening in each, the lines are somewhat blurred, which is indicative of accuracy issues.

FIG. 7B illustrates operational scenario 720. Operational scenario 720 illustrates a scenario in which the voxel lattice is hexagonal and the voxel lattice constant is approximately 1.0. Accordingly, PSF heat map 602 is the same in FIGS. 6A and 7B. Therefore, the second shadow of the PSF is matched with the voxel lattice constant such that voxels neighboring the voxel being read fall within the second shadow. Using this PSF and voxel lattice constant, image section 722 shows the illumination of each voxel in the lattice. Image section 722 illustrates a 60 micrometer×60 micrometer section of the imaged optical storage medium, and as illustrated in PSF heat map 602, each voxel is spaced approximately 1.0 micrometers apart in a hexagonal grid. The voxels may be seen in image section 722 as lighter and darker points. Histogram 730 indicates that the voxels are two-bits, meaning one of four symbols, illustrated in histogram 730 as A, B, C, and D by color. The voxels may be detected based on a level of illumination as described above with respect to FIG. 7A. Symbol A may be the absence of a voxel, which is seen by the darkest voxel spaces in image section 722. Symbol B may be a small voxel, symbol C may be a medium sized voxel, and symbol D may be a large voxel. Accordingly, brighter voxels indicate symbol D, and the less illuminated (i.e., dimmer) voxels may indicate symbol B or C. Decoder 410 may determine, based on the intensity of each voxel, which symbol is represented by the voxel. However, as shown in histogram 730, there is some overlap of symbols A and B between approximately values 122 and 125. Symbols B and C have some overlap between approximately values 128 and 130, and symbols C and D have some overlap between approximately values 133 and 136. Where there is overlap, the accuracy of the read data may be inaccurate. For example, a voxel storing symbol A may be decoded by decoder 410 as symbol B. Eye diagrams 724 and 726 illustrate that the eyes are more open in eye diagrams 724, 726 than were the eyes in eye diagrams 704 and 706 of FIG. 7A.

FIG. 7C illustrates operational scenario 740. Operational scenario 740 illustrates a scenario in which the voxel lattice is hexagonal and the voxel lattice constant is approximately 0.05. PSF heat map 748 illustrates that the first shadow 752 of the PSF function matches the voxel lattice constant, and neighboring voxels 754 (only neighboring voxels 754a and 754b are numbered) fall within the first shadow 752. Using this PSF and voxel lattice constant, image section 742 shows the illumination of each voxel in the lattice. Image section 742 illustrates a 60 micrometer×60 micrometer section of the imaged optical storage medium, and as illustrated in PSF heat map 748, each voxel is spaced approximately 0.5 micrometers apart in a hexagonal grid. The voxels may be seen in image section 742 as lighter and darker points. Histogram 750 indicates that the voxels are one-bit, meaning one of two symbols, illustrated in histogram 750 as A or B by color. The voxels may be detected based on a level of illumination as described above with respect to FIGS. 7A and 7B. Symbol A may be the absence of a voxel, which is seen by the dark voxel spaces in image section 742. Symbol B may be the presence of a voxel, which is seen by the lighter illuminations of voxel spaces in image section 742. Accordingly, brighter voxels indicate symbol B, and darker voxels may indicate symbol A. Decoder 410 may determine, based on the intensity of each voxel, which symbol is represented by the voxel. However, as shown in histogram 750, there is some (very small) overlap of symbols A and B between approximately values 30 and 31. Where there is overlap, the accuracy of the read data may be inaccurate. For example, a voxel storing symbol A may be decoded by decoder 410 as symbol B. Eye diagrams 744 and 746 illustrate that the eyes are quite open, and substantially more open than in eye diagrams 724, 726 and 704, 706 of FIGS. 7A and 7B.

FIG. 8 illustrates table 800 depicting further results of various selections for tuning read and write optical data systems (e.g., read system 316, 400 and write system 312, 100) to improve information density and read accuracy. Tunings may include which shadow to match of a PSF to the voxel lattice constant, how large to make the voxel lattice constant, which shape grid to use, how many bits per voxel to use, and the like.

Table 800 illustrates 7 rows each having a set of selections and their respective results. Describing row 1 is illustrative of the remaining 6 rows, so they will not each be described in detail. Row 1 is marked as the plan of record (POR), which did not include any tuning other than to place at least one neighboring voxel to the focus voxel in the shadow. This is represented by the data in FIGS. 6B and 7A. Accordingly, for row 1, the grid shape is rectangular with two-bits voxels (i.e., 4 possible values). The first shadow of the PSF is used for at least some of the neighboring voxels. Because the voxel lattice constant (VLC) is different in the x-axis than the y-axis. The density of voxels per micrometer is 2.9, and the accuracy of the reads with this configuration is 88.9%. However, the payload efficiency is only 55%. The payload efficiency is 4×accuracy−3, in this case 4×0.889−3, which equals 0.556, or approximately 55%. The complete calculation is (n−r)/n, where r=2t, t is the error correction capacity such that t=2n(1−accuracy), and n=the number of symbols. The payload efficiency generally represents the number of voxels that can be used for data because the rest are needed for error correction. For row 1, 55 of every 100 voxels hold data while 45 are used for ensuring data correction. The information density depicted is the symbol bit depth×density×payload efficiency, which is a general representation of a score for storage capacity of the optical storage medium using the parameters outlined. For row 1, information density is 3.2, and since row 1 is the POR, the improvement is not applicable.

As shown in row two, modifying the voxel lattice constant to 0.98 and using the second shadow improves accuracy to 97.6%, but the system still experiences a 44% reduction in information density because the voxels are spaced far apart.

The remaining rows can be reviewed for similar data. Note that the system can be tuned based on shadow used, number of bits/voxel, grid shape, and voxel lattice constant. Reviewing row 7, the system is tuned to a hexagonal grid using one-bit voxels (i.e., 2 possible values), the first shadow, and a voxel lattice constant of 0.48. Making such tuning changes, the accuracy is 99.5% and the payload efficiency is 98%, meaning only 2 of every 100 voxels is used for error correction. Therefore, the improvement is 52% in information density. Accordingly, table 800 illustrates the substantial effect tuning modifications that can have on read accuracy and storage capacity.

FIG. 9 illustrates a method 900 for tuning an optical storage read and write system (e.g., system 300). Method 900 may be performed using architecture 300 or a combination of an optical read system 400 and optical write system 100, for example. Steps may be performed in a different order, with intervening steps, or repeatedly in some embodiments. Method 900 begins with step 902 in which an optical write drive (e.g., optical write drive 106) encodes data into each pulse of a pulse train emitted from a femtosecond laser (e.g., laser system 112). For example, encoder 110 may instruct laser system 112 to emit a beam with a pulse train and instruct modulation system 120 to encode data into the pulse train of the beam.

At step 904 the optical write drive writes the data into voxels in an optical storage medium, where the voxels are written into a voxel lattice having a voxel lattice constant representing a distance between neighboring voxels in a layer of the optical storage medium. For example, read head 422 may direct the beam at precise locations such that the pulses physically modify the optical storage medium 102 to write voxels 104. The voxels are written into a voxel lattice such as voxel lattice 604, 654 depicted with respect to FIGS. 6A and 6B. The voxel lattice constant and shape of the grid may be configured by or into encoder 110 in some embodiments, which may send instructions to read head 422 or the stage on which optical storage medium 102 is sitting to move the relevant component such that the voxels are written in precise locations.

At step 906, an optical read drive (e.g., optical read drive 406) adjusts optical components of the optical read drive to match a shadow of a point spread function with the voxel lattice constant. For example, focusing system 428 may adjust optical components 430 to match a shadow (e.g., the first shadow, the second shadow, or the like) of the point spread function with the voxel lattice constant. Focusing system 428 may, for example, adjust the numerical aperture of lens 426, modulate the beam with a modulator, or the like. In some embodiments, to match the shadow to the voxel lattice constant, the optical read drive may first read portions of the optical storage medium to measure the voxel lattice constant. In some embodiments, a user interface may allow entry of the voxel lattice constant, which focusing system 428 may use to match the shadow with.

At step 908, the optical read drive reads the voxels from the optical storage medium after adjusting the optical components. For example, optical read drive 406 may use light system 412 to emit a beam, which scanning system 424 uses to illuminate voxel 404. Beam steering components in optical components 430 may direct the image containing voxel 404 information to sensor system 418. Sensor system 418 may sense the intensity of the voxel 404. Decoder 410 may use the intensity to decode the voxel 404 to a symbol value.

Advantageously, the adjustment to match the shadow with the voxel lattice constant may increase read accuracy and/or storage capacity (e.g., based on information density discussed in FIG. 8). Further steps not depicted may include setting other tuning parameters including the size of the voxel lattice constant, the number of bits per voxel, the shape of the voxel lattice, and so forth as described throughout.

FIG. 10 illustrates computing device 1001 that is representative of any system or collection of systems in which the various processes, programs, services, and scenarios disclosed herein may be implemented. Examples of computing device 1001 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof. Examples may also include microprocessors having at least storage system 1003 and processing system 1002. Accordingly, computing device 1001 may be representative of a microprocessor of encoder 110 or 310, a decoder 410, or any other microprocessor used by, for example, focusing system 428, scanning systems 124, 424, or any other microprocessor used by the optical read systems and optical write systems described herein. Further, other computing devices may be used to implement optical read and write systems described herein.

Computing device 1001 may be implemented as a single apparatus, system, or device or may be implemented in a distributed manner as multiple apparatuses, systems, or devices. Computing device 1001 includes, but is not limited to, processing system 1002, storage system 1003, software 1005, communication interface system 1007, and user interface system 1009 (optional). Processing system 1002 is operatively coupled with storage system 1003, communication interface system 1007, and user interface system 1009.

Processing system 1002 loads and executes software 1005 from storage system 1003. In some embodiments, processing system 1002, storage system 1003 and software 1005 are part of an SoC. Software 1005 includes and implements optical system processes 1006, which is (are) representative of the processes used by encoders (e.g., encoder 110, 310, 410), decoders (e.g., decoder 410), focusing systems (e.g., focusing system 428), and the like described herein. When executed by processing system 1002, software 1005 directs processing system 1002 to operate as described herein for at least the various processes, operational scenarios, and sequences discussed in the foregoing implementations. Computing device 1001 may optionally include additional devices, features, or functionality not discussed for purposes of brevity.

Referring still to FIG. 10, processing system 1002 may comprise a microprocessor and other circuitry that retrieves and executes software 1005 from storage system 1003. Processing system 1002 may be implemented within a single processing device but may also be distributed across multiple processing devices or sub-systems that cooperate in executing program instructions. Examples of processing system 1002 include general purpose central processing units, graphical processing units, application specific processors, and logic devices, as well as any other type of processing device, combinations, or variations thereof.

Storage system 1003 may comprise any computer readable storage media readable by processing system 1002 and capable of storing software 1005. Storage system 1003 may include volatile and nonvolatile, removable and non-removable media implemented in any method or technology for storage of information, such as computer readable instructions, data structures, program modules, models, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Additionally, storage system 1003 may include buffers such as write buffer 314 or read buffer 326.

In addition to computer readable storage media, in some implementations storage system 1003 may also include computer readable communication media over which at least some of software 1005 may be communicated internally or externally. Storage system 1003 may be implemented as a single storage device but may also be implemented across multiple storage devices or sub-systems co-located or distributed relative to each other. Storage system 1003 may comprise additional elements, such as a controller, capable of communicating with processing system 1002 or possibly other systems.

Software 1005 (including optical system processes 1006) may be implemented in program instructions and among other functions may, when executed by processing system 1002, direct processing system 1002 to operate as described with respect to the various operational scenarios, sequences, and processes illustrated herein. For example, software 1005 may include program instructions for implementing methods such as method 900 and operational scenarios such as operational scenarios 500, 600, 650, 700, 720, 740, and the like as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software, virtualization software, or other application software. Software 1005 may also comprise firmware or some other form of machine-readable processing instructions executable by processing system 1002.

In general, software 1005 may, when loaded in to processing system 1002 and executed, transform a suitable apparatus, system, or device (of which computing device 1001 is representative) overall from a general-purpose computing system into a special-purpose computing system customized to support secure model execution in an optimized manner. Indeed, encoding software 1005 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors.

For example, if the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems over communication networks (not shown, e.g., the Internet, wide area networks, local area networks, wired networks, wireless networks, or the like). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. An optical read system, comprising:
a read controller, comprising:
a light source configured to emit a beam, and
a sensor system configured to detect voxels written in an optical storage medium, wherein:
the voxels are written in the optical storage medium in a voxel lattice having a voxel lattice constant representing a distance between neighboring voxels in a layer of the optical storage medium;
a decoder configured to decode the voxels to identify data represented by the voxels; and
an optical read head, comprising:
optical components including one or more lenses; and
a focusing system, wherein:
the optical read head is configured to receive and steer the beam toward the voxels,
the optical components have a point spread function, and
the optical components are configured to match a shadow of the point spread function with the voxel lattice constant.

2. The optical read system of claim 1, wherein the focusing system is configured to at least adjust the point spread function to match the shadow of the point spread function with the voxel lattice constant.

3. The optical read system of claim 2, wherein to adjust the point spread function, the focusing system is configured to at least modify a numerical aperture of at least one of the one or more lenses.

4. The optical read system of claim 2, wherein to adjust the point spread function, the focusing system is configured to at least modify the beam using one of deformable mirrors or spatial light modulators.

5. The optical read system of claim 2, wherein to adjust the point spread function, the focusing system is configured to at least modify a wavelength of the beam.

6. The optical read system of claim 1, wherein the point spread function comprises at least two shadows, and the optical components are configured to match one shadow of the at least two shadows with the voxel lattice constant.

7. The optical read system of claim 1, wherein the voxel lattice comprises one of a rectangular grid and a hexagonal grid.

8. The optical read system of claim 1, wherein each voxel of the voxels stores a one-bit symbol.

9. The optical read system of claim 1, wherein each voxel of the voxels stores a two-bit symbol.

10. The optical read system of claim 1, wherein the voxel lattice constant is between 150 nanometers and 600 nanometers.

11. An optical write system, comprising:
a write controller, comprising:
a laser configured to emit a beam having a pulse train, and
a modulation system comprising modulators configured to modulate the pulses of the pulse train to encode data in each pulse of the pulse train;
an optical write head, comprising:
optical components including one or more lenses; and
a scanning system configured to use the optical components to direct the beam having the modulated pulses in the pulse train at an optical storage medium to write the data into the optical storage medium, wherein the optical components are configured to:
write the data into voxels in a voxel lattice having a voxel lattice constant representing a distance between neighboring voxels in a layer of the optical storage medium, and
match the voxel lattice constant with a shadow of a point spread function of a laser read system.

12. The optical write system of claim 11, wherein the scanning system is configured to adjust the voxel lattice constant to match the voxel lattice constant with the shadow of the point spread function.

13. The optical write system of claim 12, wherein to adjust the voxel lattice constant, the scanning system is configured to instruct movement of the optical write head to write the voxels into the optical storage medium at precise locations corresponding to the adjusted voxel lattice constant.

14. The optical write system of claim 11, wherein the point spread function comprises at least two shadows, and the optical components are configured to match the voxel lattice constant with one shadow of the at least two shadows.

15. The optical write system of claim 11, wherein the voxel lattice comprises one of a rectangular grid and a hexagonal grid.

16. The optical write system of claim 11, wherein the modulation system is configured to modulate each pulse of the pulse train to encode a one-bit symbol in each voxel of the voxels.

17. The optical write system of claim 11, wherein the modulation system is configured to modulate each pulse of the pulse train to encode a two-bit symbol in each voxel of the voxels.

18. The optical write system of claim 11, wherein the modulation system is configured to amplify each pulse of the pulse train such that each voxel of the voxels fits within a space of the voxel lattice, and the voxel lattice constant is between 150 nanometers and 600 nanometers.

19. A method, comprising:
encoding, by an optical write drive, data into each pulse of a pulse train emitted from a femtosecond laser;
writing, by the optical write drive, the data into voxels in an optical storage medium, wherein the voxels are written into a voxel lattice having a voxel lattice constant representing a distance between neighboring voxels in a layer of the optical storage medium;
adjusting, by an optical read drive, optical components of the optical read drive to match a shadow of a point spread function with the voxel lattice constant; and reading, by the optical read drive, the voxels from the optical storage medium after adjusting the optical components.

20. The method of claim 19, wherein:

the point spread function comprises at least two shadows; and the optical read drive adjusts the optical components to match one of the at least two shadows with the voxel lattice constant.

* * * * *